US007639402B2

(12) United States Patent
Vestjens et al.

(10) Patent No.: US 7,639,402 B2
(45) Date of Patent: Dec. 29, 2009

(54) METHOD OF CAMOUFLAGING DEFECTIVE PRINT ELEMENTS IN A PRINTER

(75) Inventors: Johannes C. G. Vestjens, Venlo (NL); Henry Faken, Venlo (NL)

(73) Assignee: OCE Technologies B.V., Venlo (NL)

( * ) Notice: Subject to any disclaimer, the term of this patent is extended or adjusted under 35 U.S.C. 154(b) by 1090 days.

(21) Appl. No.: 10/980,322

(22) Filed: Nov. 4, 2004

(65) Prior Publication Data

US 2005/0105105 A1 May 19, 2005

(30) Foreign Application Priority Data

Nov. 5, 2003 (EP) .................................. 03078482

(51) Int. Cl.
*G06K 15/00* (2006.01)
*H04N 1/409* (2006.01)

(52) U.S. Cl. .................... 358/3.26; 358/1.18; 358/3.01; 348/246

(58) Field of Classification Search ................ 358/3.26, 358/1.7, 1.8, 3.14, 2.99, 3.01, 3.03, 3.13; 348/246, 247; 347/5, 19
See application file for complete search history.

(56) References Cited

U.S. PATENT DOCUMENTS

| | | | | |
|---|---|---|---|---|
| 6,215,557 | B1 | 4/2001 | Owens | |
| 6,217,148 | B1 | 4/2001 | Adler et al. | |
| 6,428,139 | B1 | 8/2002 | Silverbrook | |
| 6,575,549 | B1 * | 6/2003 | Silverbrook | 347/19 |
| 6,863,361 | B2 * | 3/2005 | Barr et al. | 347/19 |

FOREIGN PATENT DOCUMENTS

| | | | |
|---|---|---|---|
| EP | 0 999 516 A2 | | 5/2000 |
| EP | 1060896 A1 | * | 12/2000 |
| EP | 1 314 561 A2 | | 5/2003 |

* cited by examiner

*Primary Examiner*—Thomas D Lee
(74) *Attorney, Agent, or Firm*—Birch, Stewart, Kolasch & Birch, LLP

(57) ABSTRACT

A printer, a computer program and a method are provided for camouflaging defective print elements in the printer having a printhead with a plurality of print elements. The method includes (a) representing the image information to be printed by a multi-level pixel matrix wherein a grey level of each pixel is indicated by a number, (b) transferring the grey levels of pixels that are assigned to a defective print element, to neighboring pixels in the pixel matrix, and (c) converting the pixel matrix having the transferred grey levels, into a bitmap to be printed.

34 Claims, 4 Drawing Sheets

METHOD OF CAMOUFLAGING DEFECTIVE PRINT ELEMENTS IN A PRINTER

The present application claims, under 35 U.S.C. § 119, the benefit of European Patent Application No. 03078482.1 filed Nov. 5, 2003, the entire contents of which are herein fully incorporated by reference.

BACKGROUND OF THE INVENTION

1. Field of the Invention

The invention relates to a method of camouflaging defective print elements in a printer having a printhead with a plurality of print elements and capable of printing a binary pixel image, wherein each pixel of the image is assigned to a print element with which it is to be printed, and image information of a pixel that is assigned to a defective print element is shifted to nearby pixel positions where it can be printed by a non-defective print element. The invention further relates to a printer and to a computer program implementing this method. The invention is applicable, for example, to an ink jet printer, the printhead of which comprises a plurality of nozzles as print elements.

2. Discussion of the Background Art

Typically, nozzles are arranged in a line that extends in parallel with the direction (subscanning direction) in which a recording medium, e.g. paper, is transported through the printer, and the printhead scans the paper in a direction (main scanning direction) perpendicular to the subscanning direction. In a single-pass mode, commonly a complete swath of the image is printed in a single pass of the printhead, and then the paper is transported by the width of the swath so as to print the next swath or in general the single-pass mode is a mode wherein a complete line is printed by only one nozzle. When a nozzle of the printhead is defective, e.g., it has become clogged, the corresponding pixel line is missing in the printed image, so that image information is lost and the quality of the print is degraded.

A printer may also be operated in a multi-pass mode, in which only part of the image information of a swath is printed in a first pass and the missing pixels are filled-in during one or more subsequent passes of the printhead. In this case, it is in some cases possible that a defective nozzle is backed-up by a non-defective nozzle, though mostly on the cost of productivity.

U.S. Pat. No. 6,215,557 discloses a method of the type indicated above, wherein, when a nozzle is defective, the print data are altered so as to bypass the faulty nozzle. This means that a pixel that would have but cannot be printed with the defective nozzle is substituted by printing an extra pixel in one of the neighbouring lines that are printed with non-defective nozzles, so that the average optical density of the image area is conserved and the defect resulting from the nozzle failure is camouflaged and becomes almost imperceptible. This method involves an algorithm that operates on a bitmap, which represents the print data, and shifts each pixel that cannot be printed to a neighbouring pixel position. However, if this neighbouring pixel position happens to be occupied by a black pixel, anyway, pursuant to the original print data, then the extra pixel cannot be printed, and a loss of image information will nevertheless occur.

European Patent Application Publication No. 0 999 516 A2 discloses a method for generating a print mask which determines a pattern in which the pixels will be printed. This document focuses on multi-pass printing, and the main purpose of the mask is to determine which pixels are to be printed in which pass. In the mask generation process, the image information to be printed is taken into account only indirectly in the form of constraints that determine the construction of the mask. For example, such a constraint may require that a yellow pixel and a cyan pixel directly adjacent thereto are not printed in the same pass of the printhead, in order to avoid colour bleeding. This document further suggests to construct the masks in such a way that defective nozzles are backed up by non-defective nozzles.

SUMMARY OF THE INVENTION

It is an object of the invention to provide a method which permits to camouflage image defects, that would otherwise be caused by defective print elements, efficiently.

It is another object of the invention to provide a printer, a computer program and a method for camouflaging defective print elements, which overcome the limitations of the background art.

According to an aspect of the invention, the objects are achieved by a method of the type indicated above, which comprises the following steps:

a) representing the image information to be printed by a multi-level pixel matrix wherein a grey level of each pixel is indicated by a number,
b) transferring the grey levels of pixels, that are assigned to a defective print element, to neighbouring pixels in the pixel matrix, and
c) converting the pixel matrix into a bitmap to be printed.

The invention is based on the consideration that image information to be printed is frequently presented to the printer in the form of a multi-level pixel matrix which is then converted into a printable bitmap by known algorithms. Each matrix cell of the pixel matrix corresponds to a pixel to be printed or to a cluster of neighbouring pixels. However, whereas the printer can only print binary pixel images, i.e. images the pixels of which are either black or white, the entries in the cells of the pixel matrix are numbers that may represent a variety of different grey levels. For example, when the numbers arrange from 0 to 255, each matrix cell may have one of 256 different grey levels ranging from white (here represented by the number "0") to black (here represented by the number "255"). If a single matrix cell corresponds to a cluster of pixels, e.g. a square of n×n pixels, then the number contained in this cell has the meaning that the grey level represented by this number applies to each of the $n^2$ pixels contained in the cell. Thus, the pixel matrix can be broken down to a matrix with single-pixel cells, and, without restricting the generality of the concept, it can be assumed that there is a one-to-one correspondence between the cells of the multi-level pixel matrix and the pixels of the printable bitmap.

The method according to an aspect of the invention operates not, at least not only, on the bitmap but mainly operates on the pixel matrix. When a print element (which will here be designated as a "nozzle" for the sake of brevity) of the printhead is known to be defective, the grey levels of the matrix cells that correspond to the defective nozzle are transferred or distributed onto neighbouring matrix cells that correspond to pixels which can be printed with non-defective nozzles. In case of a complete transfer of the grey levels, the matrix cells corresponding to the defective nozzle will all contain the number "0", and the numbers in the neighbouring matrix cells will be increased accordingly. In any case, the result will be a multi-level pixel matrix in which the matrix elements corresponding to the defective nozzle are made lighter and the neighbouring matrix elements are made darker, i.e., they have increased grey levels.

Then, one of a plurality of known algorithms such as error diffusion or dithering is used for converting the multi-level pixel matrix into a bitmap such that, although the pixels of the bitmap are either black or white, the distribution of black and white pixels, on the average, still reflects the grey levels of the multi-level pixel matrix. It should be noted that the term "bitmap", as used here, does not mean that a bitmap must actually be stored physically in a storage medium, but only means that the print data are provided in binary form, so that each pixel is represented by a single bit. Thus, the "bitmap" may well be generated "on the fly" during the print process.

It is one of the advantages of the invention that the process of shifting image information from the defective nozzle to non-defective nozzles provides more flexibility because it is carried out on the level of the multi-level pixel matrix where the ratios or weights with which the grey level is distributed onto neighbouring pixels can be varied so as to achieve optimal results. Another advantage is that the method according to an aspect of the invention is carried out at a comparatively early stage in the processing sequence, so that the method can also be adapted, for example, to printer hardware which has no sufficient processing capability for carrying out corrections on bitmap level. It is even possible that the method according to an aspect of the invention is executed in a host computer from which the print data are sent to the printer, provided that the information, indicating which nozzles are defective, is made available at the host computer. Then, if the printer forms part of a multi-user network, the data processing necessary for carrying out the invention may be distributed over a plurality of computers in the network. Moreover, the data processing for transferring the grey levels to neighbouring pixels may advantageously be combined with other image processing steps that have to be performed on multi level-data, such as gamma correction and the like.

Depending on the algorithm employed for converting the multi-level data into binary data, such as error diffusion or dithering, the invention will also increase the likelihood that the black pixels that cannot be printed are actually shifted to empty pixel positions in the neighbourhood rather than being lost.

When the multi-level data are converted into binary data, it is preferable to employ an algorithm which makes sure that the extra black pixels are not shifted back to positions where they cannot be printed. An error diffusion algorithm is considered to be particularly useful. If, for example, the error is diffused or propagated only in the direction of the pixel lines but not towards neighbouring lines, or in any case not towards the line that is assigned to the defective nozzle, the loss of image information can successfully be avoided. As an alternative, the error diffusion process may be adapted such that pixel positions which cannot be printed are skipped in the error diffusion process.

The invention is particularly useful when the print data that are supplied to the printer are in the multi-level format. However, if these data are in the binary format already, it is a simple matter to reconvert these data into multi-level data, with or without averaging over clusters of adjacent pixels, and then to employ the method as described above.

The invention is not limited to printing in the single-pass mode but is also applicable in multi-pass printing. Then, a nozzle failure will generally not have the effect that a complete line is missing in the printed image, but that, for example in the case of two-pass printing, typically half of the pixels in the line will be missing. In this case, the grey levels of the pixels that cannot be printed may not only be transferred to neighbouring pixels in the subscanning direction but also in the main scanning direction, i.e. in the direction of the pixel line.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Preferred embodiments of the invention will now be explained in conjunction with the drawings, in which.

DETAILED DESCRIPTION OF THE PREFERRED EMBODIMENTS

Figure 1:
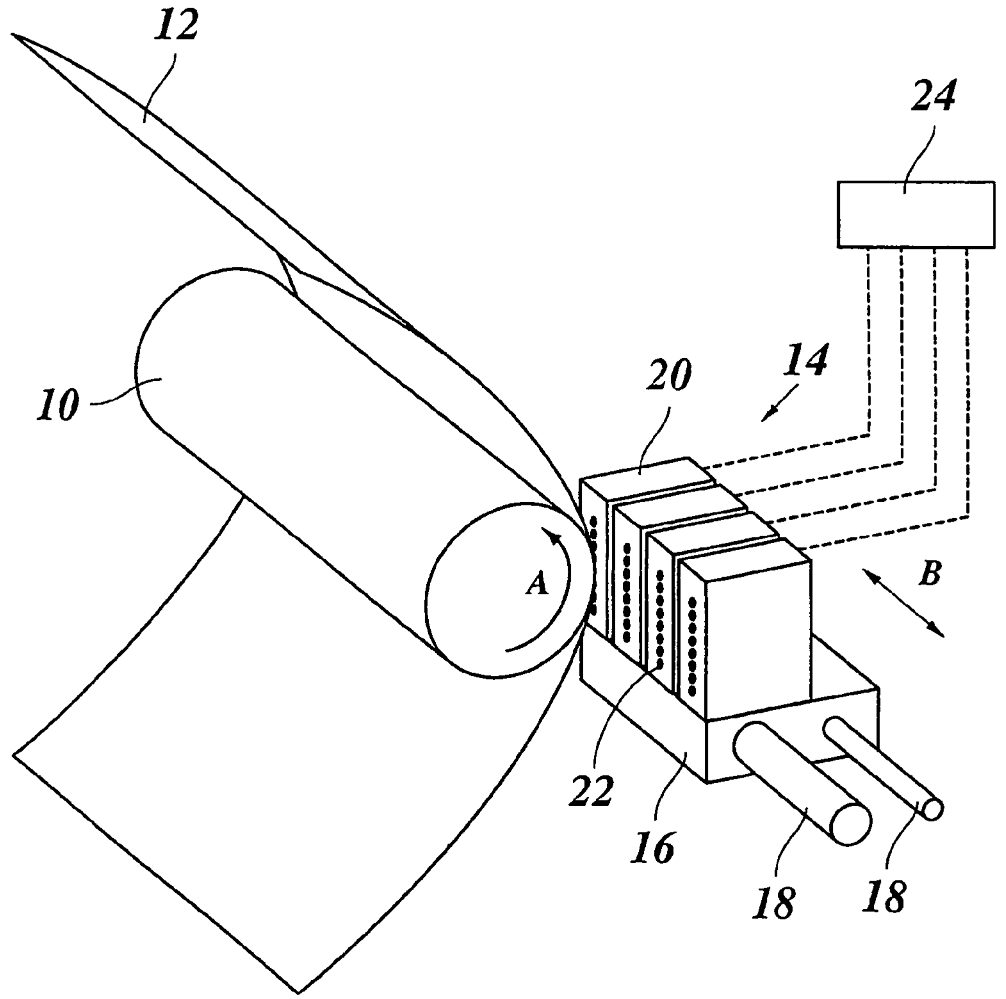
FIG. 1 is a schematic view of an ink jet printer to which the invention is applicable.

As is shown in FIG. 1, an ink jet printer comprises a platen 10 which serves for transporting a recording paper 12 in a subscanning direction (arrow A) past a printhead unit 14. The printhead unit 14 is mounted on a carriage 16 that is guided on guide rails 18 and is movable back and forth in a main scanning direction (arrow B) relative to the recording paper 12. In the example shown, the printhead unit 14 comprises four printheads 20, one for each of the basic colours, e.g., cyan, magenta, yellow and black. Each of the printheads 20 has a linear array of nozzles 22 extending in the subscanning direction. The nozzles 22 of the printheads 20 can be energized individually to eject ink droplets onto the recording paper 12, thereby to print a pixel on the paper 12. When the carriage 16 is moved in the direction B across the width of the paper 12, a swath of an image can be printed. The number of pixel lines of the swath corresponds to the number of nozzles 22 of each printhead. When the carriage 16 has completed one pass, the paper 12 is advanced by the width of the swath, so that the next swath can be printed.

The printheads 20 are controlled by a processing unit 24 which processes the print data in a manner that will be described in detail hereinbelow. The discussion will be focused on printing in black colour, but is equivalently valid for printing in other colours.

Figure 2A:
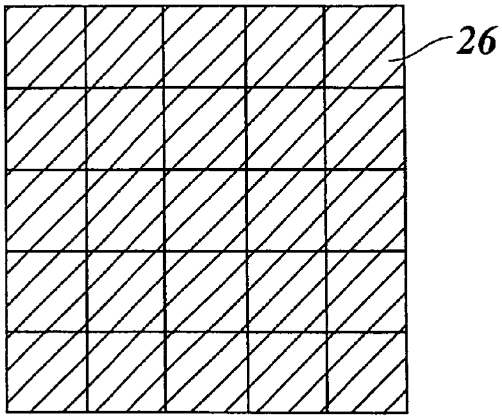
FIGS. 2A-2F are diagrams of an area of 5×5 pixels of an image in various representations, illustrating the effect of a nozzle failure.

FIG. 2A shows an array of 5×5 pixels 26, which represents a portion of an image to be printed. It is assumed here that this image portion shall uniformly be printed in grey colour, as is symbolized by hatching in FIG. 2A.

Figure 2B:
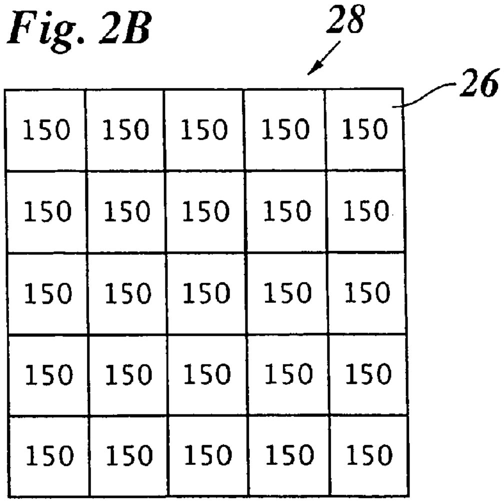

FIG. 2B shows a pixel matrix 28 the matrix cells or pixels 26 of which correspond to the pixels shown in FIG. 2A. Each matrix cell has an entry in the form of a number ("150" in this example) which indicates the grey level of the corresponding pixel. A grey level of 0 would indicate a white pixel, and a grey level of 255 would indicate a black pixel. The shown value of 150 thus corresponds to a grey level or optical density of 59%. The grey levels of all the pixels of the image to be printed constitute the essential part of the print data that are supplied to the processing unit 24 of the printer, e.g. from a host computer or from a scanner.

Figure 2C:
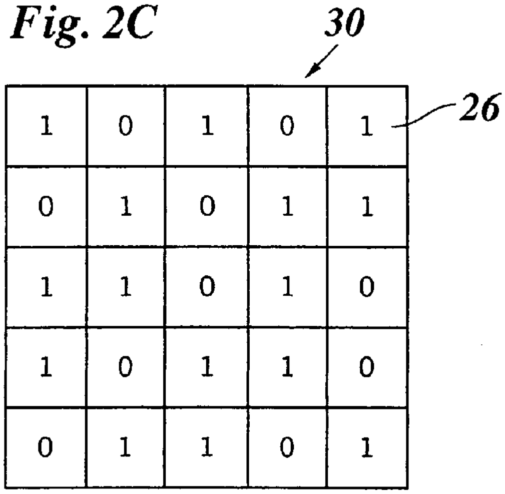

The processing unit 24 employs a half toning process for converting the multi-level print data into binary data which are shown in FIG. 2C in the form of a bitmap 30. Various types of half toning algorithms such as error diffusion or dithering are well known in the art and are therefore not described here in detail. The result of this process is that the value of each pixel 26 in the bitmap 30 is either 0 or 1 but the average of the pixel values over a larger number of pixels approximates the desired grey level of 59%.

Figure 2D:
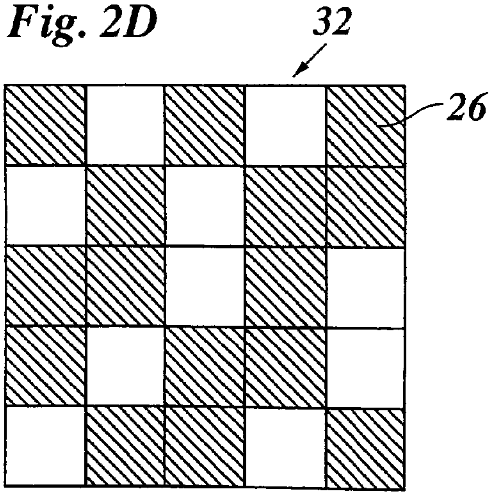

A corresponding pixel image 32 of black and white pixels is shown in FIG. 2D, where black pixels are indicated by hatching. It will be understood that each line of the pixel image 32 will be printed by a specific one of the nozzles 22 of the printhead 20. If a single-pass mode is employed, as shall be assumed here, all the pixels 26 of a given line are printed by the same nozzle 22. Thus, if a nozzle is defective, the corresponding line cannot be printed.

Figure 2E:
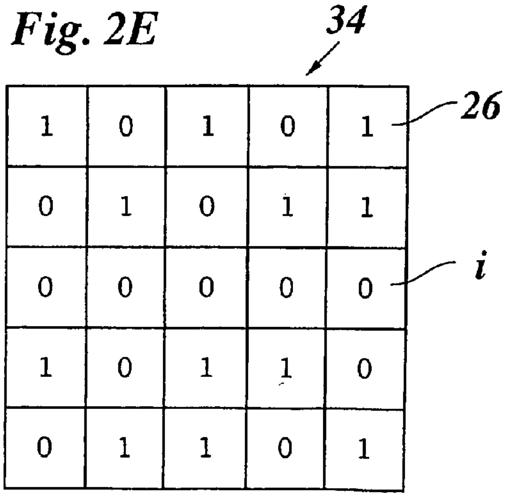
Figure 2F:
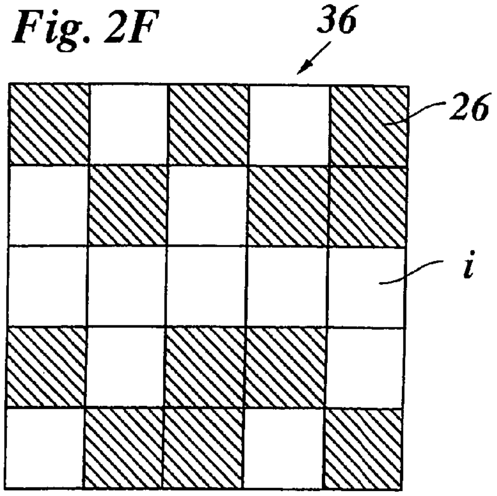

As an example, FIG. 2E shows the effective bitmap 34, i.e. the bitmap that will actually be printed, for the case that the nozzle associated with the third line "i" of the bitmap is defective. FIG. 2F shows the corresponding pixel image 36, where the line i appears as a white line on a grey background.

The processing unit 24 processes the image data in order to camouflage or mitigate the visible effect of the nozzle failure, so that the printer may still be used and may still produce images in acceptable quality, even when the printhead is not replaced immediately. This data processing algorithm will now be explained in conjunction with FIGS. 3A-3D.

Figure 3A:
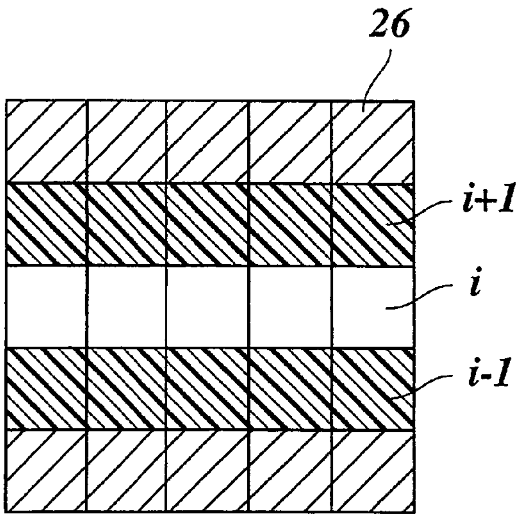
FIGS. 3A-3D are diagrams analogous to FIGS. 2A, 2B, 2E and 2F, illustrating the method according to an embodiment of the invention for camouflaging the effect of the nozzle failure.

FIG. 3A corresponds to FIG. 2A and shows the visual impression that can and shall be achieved in spite of the nozzle failure. The visual effect of the white line i is camouflaged or mitigated by making the neighbouring lines i+1, i−1 somewhat darker.

To this end, the pixel matrix 28 shown in FIG. 2B is transformed as follows. The grey levels (150) of each pixel 26' in line i are equally distributed onto the upper and lower neighbours of this pixel. The result is illustrated by the pixel matrix 28' in FIG. 3B. Here, the grey levels of the pixels 26" in lines i+1, i−1 have been increased from 150 to 225, i.e. by one half of the value 150 in line i that cannot be reproduced. Thus, on the average, the optical density of the image is preserved.

Figure 3B:
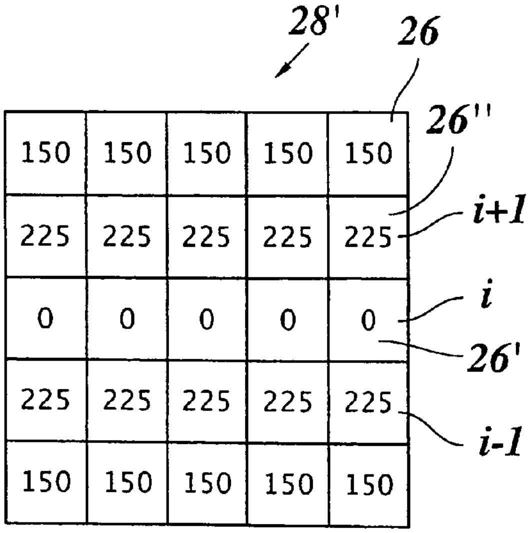
Figure 3C:
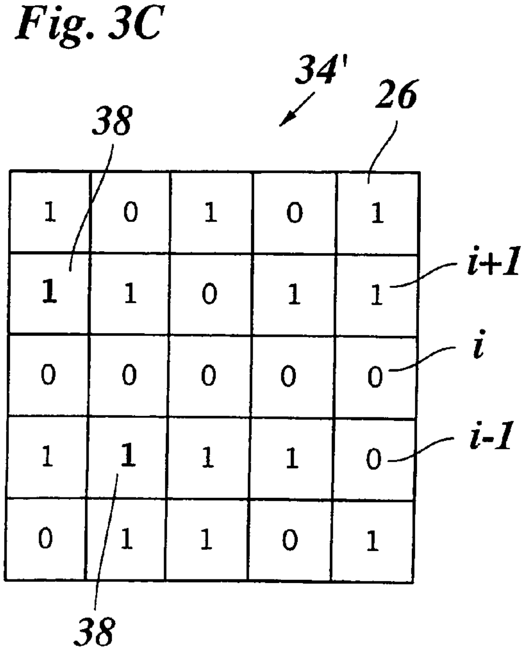
Figure 3D:
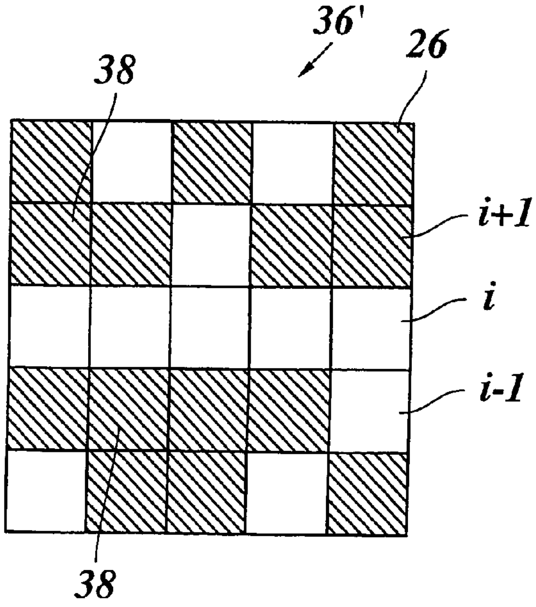

The error diffusion process is now applied to the modified pixel matrix 28', resulting in the effective bitmap 34' shown in FIG. 3C. Comparing FIG. 3C to FIG. 2E, it can be seen that two extra black pixels 38 (with the bit value "1") have occurred in lines i+1 and i−1. The resulting pixel image 36', shown in FIG. 3D, is a good approximation of what is shown in FIG. 3A.

It should be observed here that the pixel images have been shown in the drawings in a largely exaggerated scale and that, in practice, the size of the individual pixels 26 will be at the limit or even below the limit of the spatial resolution of the human eye, so that the remaining defects will be substantially invisible.

In principle, depending on the type of error diffusion process employed, it is possible that the conversion from FIG. 3B to FIG. 3C leads again to the appearance of black pixels in line i. This undesirable effect can however be avoided for example by adopting an error diffusion process in which the error is propagated from pixel to pixel only in the direction of the pixel lines. Alternatively, if a process is employed, in which a first portion of the error in each pixel is diffused to the neighbouring pixel or pixels in the same line and the remaining portion of the error is diffused to the neighbouring pixel in the next lower line, then line i+1 needs special consideration. The error diffused from line i+1 into line i might accumulate in line i and might in some cases produce a "1", i.e. a non-printable black pixel in line i. This, however, would be a very unlikely event, because all the pixels in line i (FIG. 3B) have the grey level 0. In order to further improve the result, the process may be modified for example in that the error from line i+1 is not diffused to line i but is diffused directly to line i−1, so that the pixels in line i would be skipped in the error diffusion.

Instead of error diffusion, the conversion from FIG. 3B and FIG. 3C may also be achieved by a well-known process of dithering. Then, in FIG. 3B, the grey levels 0 in line i would make sure that no black pixels appear in line i, and the increased grey levels (225) in lines i+1 and i−1 would increase the likelihood that the threshold provided in the dither matrix is exceeded and additional black pixels are created.

The method described above may further be modified in various ways. For example, in FIG. 3B, the grey levels which used to be 150 in line i have been distributed with equal weights (50% each) onto the upper and lower neighbours in lines i+1 and i−1, resulting in the grey levels 225. As an alternative, other weight factors such as 60:40 or the like may be used. Likewise, it is possible to overcompensate for the loss of density in line i, for example by increasing the grey levels in both lines i+1 and i−1 by 60% of the original grey level in line i. Conversely, the loss of density may be undercompensated by shifting, for example, only 40% upwards and only 40% downwards. The remainder of 20% may be discarded or may be left in line i, so that it may still have an impact on the error diffusion.

The weight factors with which the grey levels in the line i are transferred or distributed onto neighbouring pixels may also be made dependent on the original grey levels in line i and/or in the vicinity thereof and/or on the gradient of the grey levels in the original pixel matrix 28 (FIG. 2B). For example, if a gradient in line i exists, so that the grey levels in line i+1 are larger than those in line i−1, then it may be preferable to increase the weight factor with which the grey levels are shifted from line i to line i+1 and to reduce the weight factors with which the grey levels are shifted to line i−1, respectively, in proportion to the steepness of the gradient. As an example, consider the case that the original pixel matrix 28 has high grey levels in the first line and in lines i+1 and i and zero grey levels in line i−1 and the lowest line. This would mean that line i forms the boundary of a dark area in the top part of the image. Then, the process shown in FIGS. 3B and 3C might result in a frayed appearance of the boundary. However, if in this case the grey levels from line i are shifted with a weight of 100% to line i+1 and with a weight of 0% to line i−1 (the weight ratio being a monotonously increasing function of the grey level gradient), then a smooth appearance of the boundary would be preserved, and the boundary would only be shifted upwardly by one pixel.

According to yet another modification, the image data to be printed may be subjected to a segmentation process for identifying boundaries and thin lines, and then the weight factors may be made dependent on the result of the segmentation. For example, if the segmentation reveals that a thin, only one pixel wide line on a white background is present in line i, the process shown in FIGS. 3B and 3C would result in a somewhat blurred appearance of the line, and it would be preferable to shift the complete line one pixel in the upward direction (weight factors 100:0) or in the downward direction (weight factors 0:100).

Figure 4A:
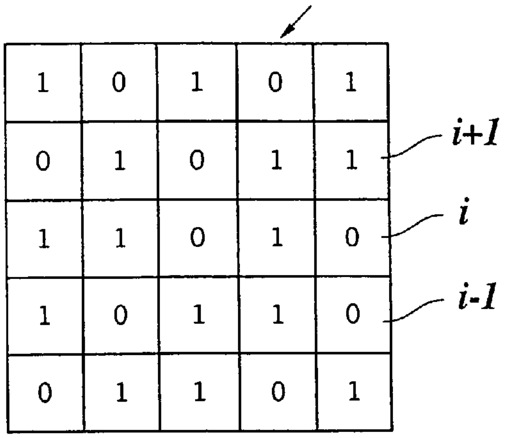
FIGS. 4A-4D are diagrams similar to FIGS. 3A-3D, illustrating another embodiment of the invention.
Figure 4B:
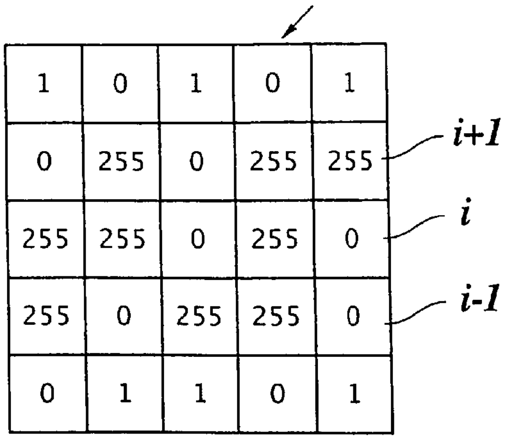

Another embodiment of the invention will be explained in conjunction with FIGS. 4A-4D. In this embodiment, it is assumed that the print data are supplied to the printer already in the binary format, i.e. in the form of a bitmap 40, as shown in FIG. 4A. Then, a first step of the method involves converting the binary bitmap into a multi-level pixel matrix 42, as is shown in FIG. 4B. This may be done in a straightforward manner simply by changing the "ones" in FIG. 4A to the grey values (255) representing black pixels in FIG. 4B, and by leaving the "zeros" as they are. Further, this conversion may be limited to line i where the nozzle defect occurs and to its neighbours i+1, i−1.

Figure 4C:
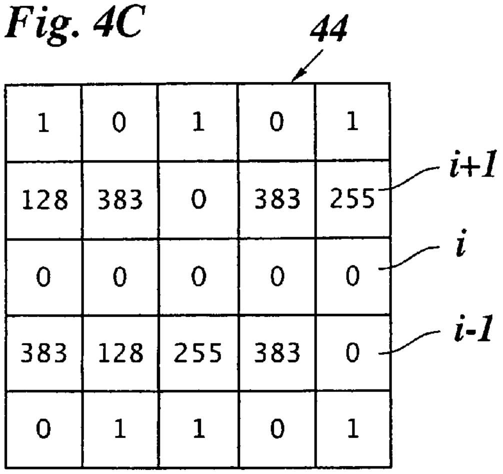
Figure 4D:
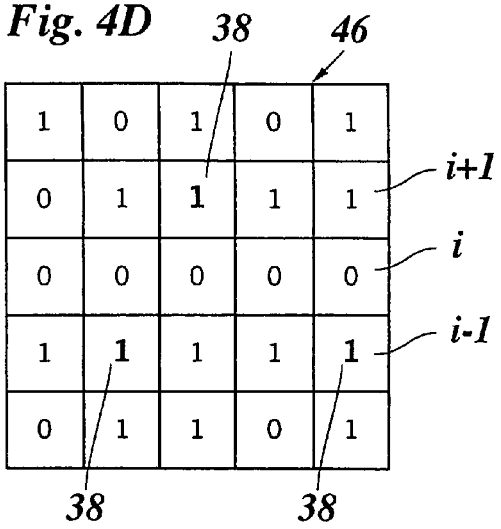

The pixel matrix 42 is modified to obtain a pixel matrix 44 as shown in FIG. 4C in the same manner as has been explained above in conjunction with FIG. 3B. The grey values 255 in line i in FIG. 4B are shifted with a weight factor of 50% into line i+1 in FIG. 4C and with a weight factor of 50% into line i−1, with the result that the corresponding grey levels in lines i+1 and i−1 in FIG. 4C are increased to 128 and 383, respectively. Of course, a grey level of 383 cannot be reproduced directly, because a grey level of 255 corresponds already to a plain black pixel. However, these "oversized" grey levels influence the error diffusion process which results in the bitmap 46 shown in FIG. 4D. As a consequence, extra black pixels 38 appear again in lines i+1 and i−1 in FIG. 4D, comparable to what was achieved in FIG. 3C.

In a modified embodiment, the step leading from FIG. 4A to FIG. 4B may also involve an averaging procedure. For example, the pixels in FIG. 4A may be combined to 2×2 superpixels and the bits of the four pixels in the superpixel may be summed. The sum will be either 0, 1, 2, 3 or 4. Depending on the value of this sum, a grey level of 0, 63, 127, 191 or 255 would be assigned to each pixel of this superpixel in FIG. 4B. Of course, the averaging procedure should be applied only to the lines in the vicinity of line i but not to line i itself.

Figure 5A:
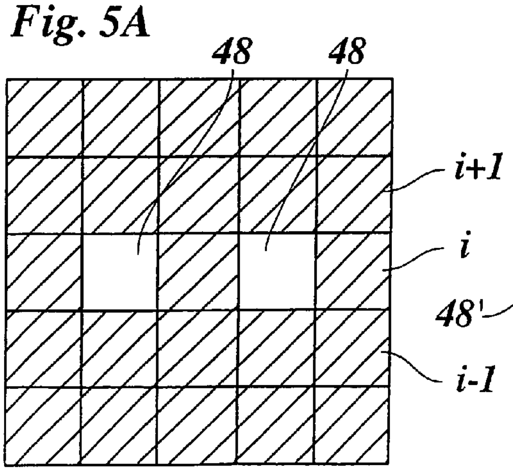
FIGS. 5A and 5B are diagrams illustrating yet another embodiment of the invention.
Figure 5B:
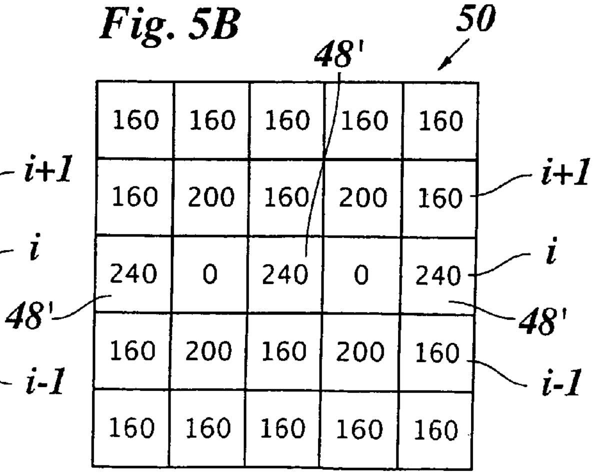

FIGS. 5A and 5B illustrate another embodiment of the invention which is adapted to a specific two-pass print mode. In this embodiment, when the nozzle corresponding to line i is defective, every second pixel in this line can still be printed, and only the remaining pixels 48 in this line are left blank, as is shown in FIG. 5A. It shall be assumed here that, in the original pixel matrix (not shown) all pixels had a grey level of 160. FIG. 5B shows the modified pixel matrix 50, in which the grey levels of the pixels 48 (160) have been distributed not only over the upper and lower neighbours but also over the left and right neighbours 48', each with a weight factor of 25%. As a result, the grey level of some of the pixels in lines i+1 and i−1 are increased by 40 to 200 and the printable pixels 48' in line i are increased by 80 to 240. The increment of 80 is due to the fact that these pixels receive increments from both, their left and right neighbours.

The pixel matrix 50 shown in FIG. 5B is then subjected to dithering or error diffusion essentially in the same way as has been described in conjunction with FIG. 3C. Again, in case of error diffusion, care should be taken that the pixels 48 are not re-transformed into black pixels.

The possible modifications discussed in conjunction with FIGS. 3A-3D may equivalently apply to the embodiment shown in FIGS. 5A and 5B. In particular, the weight factors may be varied, which includes also the possibility that the weight factors for shifting from line i into lines i+1 and i−1 are made zero, so that the grey levels are shifted or distributed only horizontally in line i from the pixels 48 to their neighbours 48'.

The processes of the present invention discussed herein in connection with FIGS. 2A-5B are executed by the processing unit 24 or other suitable processor(s). These processing steps of the present invention are implementable using computer programs(s) with existing computer programming language. Such computer program(s) may be stored in memories such as RAM, ROM, PROM, etc. associated with computers, e.g., a memory in the processing unit 24 of the printer. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of camouflaging defective print elements in a printer having a printhead with a plurality of print elements and capable of printing a binary pixel image, wherein each pixel of the image is assigned to a print element with which it is to be printed, and image information of a pixel that is assigned to a defective print element is shifted to nearby pixel positions where it can be printed with a non-defective print element, the method comprising the steps of:

a) representing the image information to be printed by a multi-level pixel matrix wherein a grey level of each pixel is indicated by a number;

b) transferring the grey levels of pixels that are assigned to a defective print element, to neighbouring pixels in the pixel matrix; and c) converting the pixel matrix having the transferred grey levels, into a bitmap to be printed.

2. The method of claim 1, wherein the step (b) comprises:

transferring the grey levels of pixels in a pixel line (i) that is assigned to the defective print element, to pixels in neighbouring pixel lines (i+1, i−1).

3. The method of claim 1, wherein, for a print mode in which the pixels of a pixel line (i) can be printed with more than one print element, the step (b) comprises:

transferring the grey levels of pixels that are assigned to the defective print element, to neighbouring pixels.

4. The method of claim 3, wherein the step (b) comprises the transfer of pixels that are assigned to the defective print element to neighbouring pixels in the same pixel line (i).

5. The method of claim 1, wherein the step (b) comprises:

distributing the grey level of each pixel that is assigned to a defective print element, onto a plurality of neighbouring pixels in accordance with predetermined weight factors.

6. The method of claim 5, wherein the weight factors are determined depending on the contents of the image information of an image area that includes the pixel assigned to the defective print element, the grey level of which being distributed.

7. The method of claim 1, wherein the step (c) comprises a dithering step.

8. The method of claim 1, wherein the step (c) comprises an error diffusion step.

9. The method of claim 8, wherein the error diffusion step is performed pursuant to a scheme which prevents a pixel, which is assigned to a defective print element, from receiving a bit that needs to be printed.

10. The method of claim 1, wherein the step (b) comprises:

dividing the grey levels of each pixel in a pixel line (i) that is assigned to the defective print element according to a predetermined algorithm to create first and second grey level percentages; and adding the first and second percentages to grey levels of corresponding pixels in neighbouring pixel lines (i+1, i−1).

11. The method of claim 10, wherein the first and second percentages are not equal.

12. The method of claim 1, wherein the step (b) comprises:

for each pixel in a pixel line (i) that is assigned to the defective print element, increasing grey levels of corresponding pixels in neighbouring pixel lines (i+1, i−1) to a predetermined value equal to or less than a maximum grey level value.

13. A printer capable of printing a binary pixel image, the printer comprising:

a printhead having a plurality of print elements configured to print a binary pixel image; and a processing unit configured to control the printhead, representing an image information of the image to be printed by a multi-level pixel wherein a grey level of each pixel is indicated by a number, to transfer the grey levels of pixels that are assigned to a defective print element, to neighbouring pixels in the pixel matrix, and to convert the pixel matrix having the transferred grey levels, into a bitmap to be printed.

14. The printer of claim 13, wherein the processing unit is configured to transfer the grey levels of pixels in a pixel line (i) that is assigned to the defective print element, to pixels in neighbouring pixel lines (i+1, i−1).

15. The printer of claim 13, wherein, for a print mode in which the pixels of a pixel line (i) can be printed with more than one print element, the processing unit is configured to transfer the grey levels of pixels that are assigned to the defective print element, to neighbouring pixels.

16. The printer of claim 15, wherein the processing unit is configured to transfer pixels that are assigned to the defective print element to neighbouring pixels in the same pixel line (i).

17. The printer of claim 13, wherein the processing unit is configured to distribute the grey level of each pixel that is assigned to a defective print element, onto a plurality of neighbouring pixels in accordance with predetermined weight factors.

18. The printer of claim 17, wherein the weight factors are determined depending on the contents of the image information of an image area that includes the pixel assigned to the defective print element, the grey level of which being distributed.

19. The printer of claim 13, wherein the processing unit is configured to convert the pixel matrix into the bitmap using a dithering step or an error diffusion step.

20. The printer of claim 19, wherein the processing unit is configured to perform the error diffusion step pursuant to a scheme which prevents a pixel, which is assigned to a defective print element, from receiving a bit that needs to be printed.

21. The printer of claim 13, wherein the processing unit is configured to divide the grey levels of each pixel in a pixel line (i) that is assigned to the defective print element according to a predetermined algorithm to create first and second grey level percentages; and add the first and second percentages to grey levels of corresponding pixels in neighbouring pixel lines (i+1, i−1).

22. The printer of claim 21, wherein the first and second percentages are not equal.

23. The printer of claim 13, wherein for each pixel in a pixel line (i) that is assigned to the defective print element, the processing unit is configured to increase grey levels of corresponding pixels in neighbouring pixel lines (i+1, i−1) to a predetermined value equal to or less than a maximum grey level value.

24. A computer program product embodied on at least one computer-readable medium associated with a processing unit of a printer, for camouflaging defective print elements in the printer having a printhead with a plurality of print elements and capable of printing a binary pixel image, wherein each pixel of the image is assigned to a print element with which it is to be printed, and image information of a pixel that is assigned to a defective print element is shifted to nearby pixel positions where it can be printed with a non-defective print element, the computer program product comprising computer-executable instructions for:

a) representing the image information to be printed by a multi-level pixel matrix wherein a grey level of each pixel is indicated by a number;

b) transferring the grey levels of pixels that are assigned to a defective print element, to neighbouring pixels in the pixel matrix; and c) converting the pixel matrix having the transferred grey levels, into a bitmap to be printed.

25. The computer program product of claim 24, wherein the transferring (b) comprises:

transferring the grey levels of pixels in a pixel line (i) that is assigned to the defective print element, to pixels in neighbouring pixel lines (i+1, i−1).

26. The computer program product of claim 24, wherein, for a print mode in which the pixels of a pixel line (i) can be printed with more than one print element, the transferring (b) comprises:

transferring the grey levels of pixels tat are assigned to the defective print element, to neighbouring pixels.

27. The computer program product of claim 26, wherein the transferring (b) comprises the transfer of pixels that are assigned to the defective print element to neighbouring pixels in the same pixel line (i).

28. The computer program product of claim 24, wherein the transferring (b) comprises:

distributing the grey level of each pixel that is assigned to a defective print element, onto a plurality of neighbouring pixels in accordance with predetermined weight factors.

29. The computer program product of claim 28, wherein the weight factors are determined depending on the contents of the image information of an image area that includes the pixel assigned to the defective print element, the grey level of which being distributed.

30. The computer program product of claim 24, wherein the converting (c) comprises a dithering step or an error diffusion step.

31. The computer program product of claim 30, wherein the error diffusion step is performed pursuant to a scheme which prevents a pixel, which is assigned to a defective print element, from receiving a bit that needs to be printed.

32. The computer program product of claim 24, wherein the step (b) comprises:

dividing the grey levels of each pixel in a pixel line (i) that is assigned to the defective print element according to a predetermined algorithm to create first and second grey level percentages; and adding the first and second percentages to grey levels of corresponding pixels in neighbouring pixel lines (i+1, i−1).

33. The computer program product of claim 32, wherein the first and second percentages are not equal.

34. The computer program product of claim 24, wherein the step (b) comprises:

for each pixel in a pixel line (i) that is assigned to the defective print element, increasing grey levels of corresponding pixels in neighbouring pixel lines (i+1, i−1) to a predetermined value equal to or less than a maximum grey level value.

* * * * *

UNITED STATES PATENT AND TRADEMARK OFFICE

CERTIFICATE OF CORRECTION

PATENT NO. : 7,639,402 B2 
APPLICATION NO. : 10/980322
DATED : December 29, 2009
INVENTOR(S) : Johannes C. G. Vestjens et al.

It is certified that error appears in the above-identified patent and that said Letters Patent is hereby corrected as shown below:

On the Title Page, item (30) Foreign Application Priority Data is incorrect:

"Nov. 5 2003 (EP) 03078482"

should read

--Nov. 5 2003 (EP) 03078482.1--.

Signed and Sealed this

Sixth Day of July, 2010

David J. Kappos

David J. Kappos
*Director of the United States Patent and Trademark Office*